United States Patent
Nakayama et al.

(10) Patent No.: US 7,756,736 B2
(45) Date of Patent: Jul. 13, 2010

(54) WORKING MACHINE MANAGEMENT SYSTEM

(75) Inventors: Tetsuya Nakayama, Hiratsuka (JP);
Shuji Arakawa, Hiratsuka (JP); Yukie Nishikawa, Hiratsuka (JP); Hidenori Koizumi, Hiratsuka (JP)

(73) Assignee: Komatsu Ltd, Tokyo (JP)

( * ) Notice: Subject to any disclaimer, the term of this patent is extended or adjusted under 35 U.S.C. 154(b) by 1111 days.

(21) Appl. No.: 10/577,530

(22) PCT Filed: Oct. 26, 2004

(86) PCT No.: PCT/JP2004/015822

§ 371 (c)(1),
(2), (4) Date: Apr. 28, 2006

(87) PCT Pub. No.: WO2005/043481

PCT Pub. Date: May 12, 2005

(65) Prior Publication Data

US 2007/0094055 A1    Apr. 26, 2007

(30) Foreign Application Priority Data

Oct. 31, 2003    (JP) .............................. 2003-372703

(51) Int. Cl.
G06F 9/46    (2006.01)
(52) U.S. Cl. .......................................... 705/8; 701/133
(58) Field of Classification Search .................... 705/8
See application file for complete search history.

(56) References Cited

U.S. PATENT DOCUMENTS 6,349,252 B1    2/2002    Imanishi et al.

6,484,088 B1 *    11/2002    Reimer ........................ 701/123

(Continued)

FOREIGN PATENT DOCUMENTS

EP    0 989 525 A2    3/2000

(Continued)

OTHER PUBLICATIONS

English Translation of Chinese Office Action dated Jun. 20, 2008, issued in corresponding Chinese Patent Application No. 200480032159.6.

(Continued)

*Primary Examiner*—Romain Jeanty
(74) *Attorney, Agent, or Firm*—Westerman, Hattori, Daniels & Adrian, LLP

(57) ABSTRACT

A server (10) enables users (A-B) sharing the same working machine (1) to mutually monitor a usage state by each user. The server (10) receives a user ID, the working time, the engine cooling water temperature, and the current position that are detected in the working machine (1) through a satellite communication network, and calculates the usage time, the usage location, the load amount, and a usage proportion for each user. The server (10) sends a warning to the user terminals 20 when the usage time or location is not as planned, or the load amount is excessive. The server (10) periodically reports the usage times and locations, the load amounts, and the usage proportions for the users (A-B) to the user terminals (20). The server (10) allocates maintenance costs of the working machine (1) automatically between the users (A-B) according to the usage proportions of the users (A-B).

3 Claims, 12 Drawing Sheets

U.S. PATENT DOCUMENTS 6,912,481 B2 * 6/2005 Breunissen et al. ......... 702/184
6,954,689 B2 * 10/2005 Hanson et al. ................. 701/33

FOREIGN PATENT DOCUMENTS

| JP | 8215992 A * | 8/1996 |
|---|---|---|
| JP | 11-153434 | 6/1999 |
| JP | 2000-76505 | 3/2000 |
| JP | 20000297443 | 10/2000 |
| JP | 2002-091547 | 3/2002 |
| JP | 2002-358598 | 12/2002 |
| JP | 2003-37550 | 2/2003 |
| JP | 2003-140743 A | 5/2003 |
| JP | 2003-288497 A | 10/2003 |
| WO | WO 00/55827 | 9/2000 |
| WO | WO 0052627 A1 * | 9/2000 |
| WO | WO 03/007270 | 1/2003 |

OTHER PUBLICATIONS

International Search Report of PCT/JP2004/015822, date of mailing Feb. 15, 2005.

* cited by examiner

FIG. 4

91 RESERVATION TABLE

| | DAY OF RESERVATION | DAY PLANNED FOR OPERATION | TIME PLANNED FOR OPERATION | PLACE PLANNED FOR OPERATION |
|---|---|---|---|---|
| | XXXX / XX / XX | XXXX / XX / XX | XX HOURS XX MINUTES TO XX HOURS XX MINUTES | XX PREFECTURE XX TOWN XX WARD |
| | ⋮ | ⋮ | ⋮ | ⋮ |
| | ⋮ | ⋮ | ⋮ | ⋮ |
| | ⋮ | ⋮ | ⋮ | ⋮ |
| JOINT OWNER A | ⋮ | ⋮ | ⋮ | ⋮ |
| | ⋮ | ⋮ | ⋮ | ⋮ |
| | ...... | ...... | ...... | ...... |

FIG. 5

92 JOINT OWNER TABLE

| | ACTUAL DAY OF OPERATION | ACTUAL WORKING TIME | ACTUAL PLACE OF OPERATION | WATER | ... | TEMPERATURE | | | | AVERAGE WATER TEMPERATURE | LOAD AMOUNT OVER ONE DAY |
|---|---|---|---|---|---|---|---|---|---|---|---|
| JOINT OWNER A | XXXX/XX/XX | XX HOURS XX MINUTES TO XX HOURS XX MINUTES | XX PREFECTURE XX TOWN XX WARD | XX | ... | XX | XX | XX | XX | XX | XXXX |
| | ⋮ | ⋮ | ⋮ | ⋮ | ⋮ | ⋮ | ⋮ | ⋮ | ⋮ | ⋮ | ⋮ |

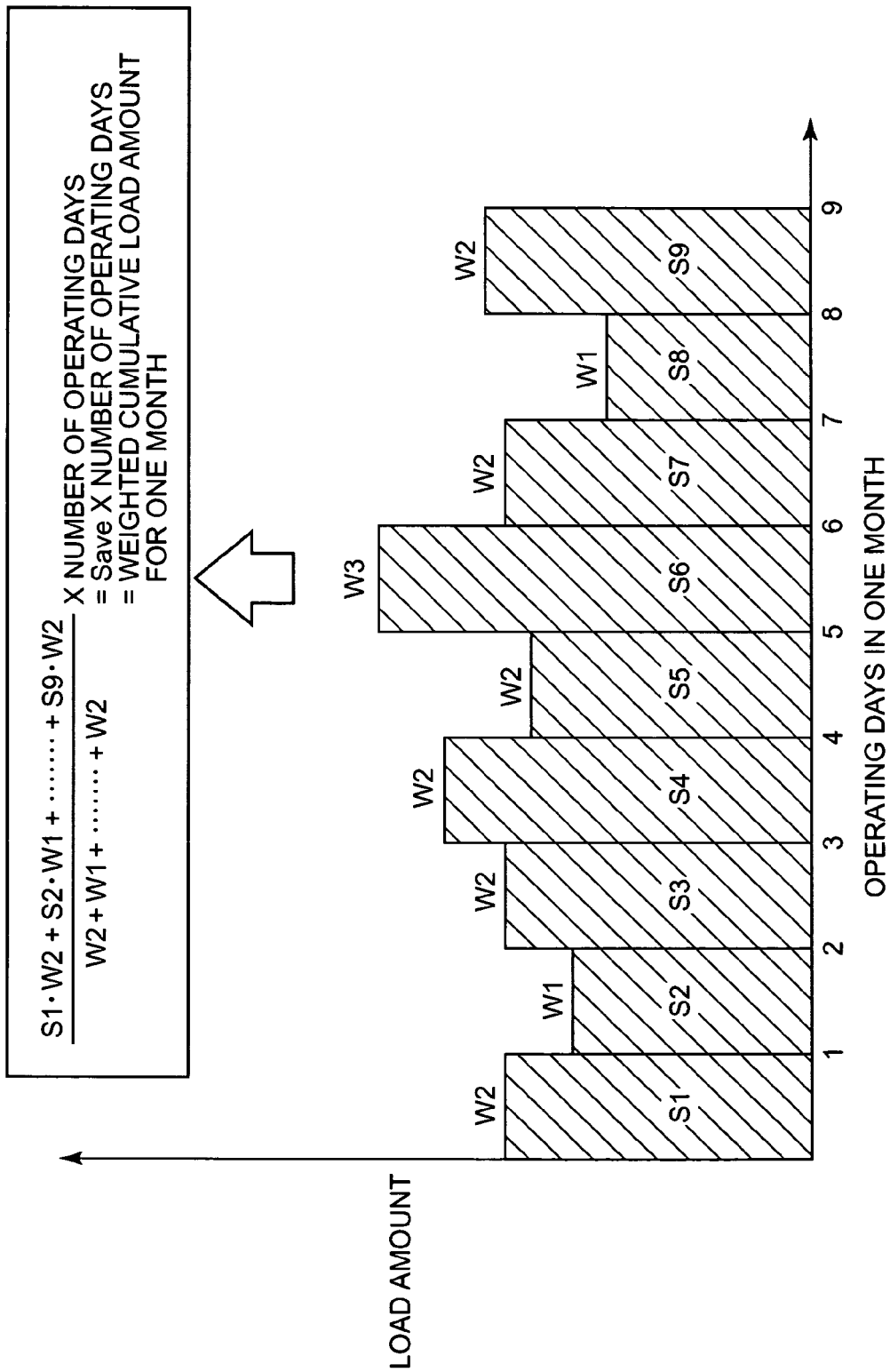

FIG. 10

| DATE | USER | OPERATION HISTORY (UPPER LINE: RESERVED; LOWER LINE: RESULT) | WORKING TIME (UPPER LINE: RESERVED; LOWER LINE: RESULT) | LOAD AMOUNT OVER ONE DAY | WARNING |
|---|---|---|---|---|---|
| 2003/10/01 | B | | 6 HOURS 00 MINUTE / 6 HOURS 24 MINUTES | 512 | |
| 2003/10/02 | B | | 9 HOURS 00 MINUTE / 10 HOURS 06 MINUTES | 801 | ● |
| 2003/10/03 | A | | 8 HOURS 00 MINUTE / 7 HOURS 38 MINUTES | 633 | ★ |
| 2003/10/04 | C | | 8 HOURS 00 MINUTE / 7 HOURS 46 MINUTES | 698 | — |
| 2003/10/05 | B | | 8 HOURS 00 MINUTE | 712 | |

53 — ●
55 — ★
54 — —

PLEASE SET INTERVAL TO BE DISPLAYED
2003 / 10 / 1  ~  2003 / 10 / 7

USAGE STATE / USAGE PROPORTION

FIG. 11

/ USAGE PROPORTION \ USAGE STATE \

PLEASE SET INTERVAL TO BE DISPLAYED

2003 ▶ 10 ▶ 1 ▶ ~ 2003 ▶ 10 ▶ 7 ▶

| OPERATING MONTH | CUMULATIVE LOAD AMOUNT FOR OCTOBER | | | | USAGE PROPORTION | | |
|---|---|---|---|---|---|---|---|
| | A | B | C | 4204 | A | B | C |
| OCTOBER | 3164 | 6884 | C | 4204 | 22.2% | 48.3% | 29.5% |

WORKING MACHINE MANAGEMENT SYSTEM

TECHNICAL FIELD

The present invention relates to a management system for a working machine such as a construction machine or one for transportation work or the like.

BACKGROUND ART

Management systems are known (for example, Patent Document #1) which manage collectively the operational states of working machines such as a large number of construction machines or transportation vehicles or the like which are present in several locations. With these management systems, various types of sensor are mounted on the working machines, and operational data (data such as, for example, working time, engine rotational speed, battery voltage, engine cooling water temperature, remaining amount of fuel and the like) are generated based on the detection signals from those sensors. This operational data for the working machines is gathered by a server via a computer network which includes a wireless communication network. And the server accumulates the operational data for the working machines, and automatically performs supply of this operational data to the user terminals via the above described computer network.

Patent Document #1: Japanese Patent Laid-Open Publication 2002-91547.

DISCLOSURE OF THE INVENTION

Sometimes it happens that a plurality of users share their funds and purchase the same working machine together. In this type of case, it is desirable for it to be possible for the joint owners mutually to monitor whether or not the working machine is being properly used or not by each of the joint owners. For example it is desirable for mutual monitoring to be made possible, in order to be able to prevent one of the joint owners from using the working machine to a greater extent than his share or to an excessively relentless degree, or to prevent an employer (an operator) from covertly using the working machine without permission. Furthermore, it is also desirable to be able to ascertain the amount of use of the working machine by each of the joint owners, in other words the usage proportions, in order to make it possible to apportion the expenses, such as the maintenance costs of the working machine and the like, appropriately between the joint owners. However, with prior art management systems, it is difficult for joint owners mutually to monitor the state of usage of a working machine by several persons.

The object of the present invention is to make it possible for a plurality of users, who share the same working machine, mutually to monitor the state of usage of the working machine by several persons.

According to one aspect of the present invention, in a management system for managing the usage state of a working machine by a plurality of users, there are included the working machine and a server which are capable of mutual intercommunication via a wireless communication network, and the server is also capable of communication with a plurality of user terminals. The working machine includes: identification information input means which inputs user identification information of one user who is using the working machine at the present time; machine information generation means which receives a signal from a predetermined sensor within the working machine and generates machine information related to the state or to the operation of the working machine; and a communication device which can perform communication with the server via the wireless communication network, and which transmits to the server the user identification information which has been inputted by the identification information input means and the machine information which has been generated by the machine information generation means. And the server includes: storage means which stores information; communication control means which can perform communication with the working machine via the wireless communication network, which also can perform communication with the plurality of user terminals, and which receives the user identification information and the machine information from the working machine and moreover transmits a warning to the plurality of user terminals; usage state decision means which detects by which user usage of the working machine which constitutes a problem is performed, based on the user identification information and the machine information received by the communication control means; and warning generation means which generates the warning in response to the usage state decision means, and transmits the warning to the plurality of user terminals by the communication device.

In a preferred embodiment, the working machine comprises a working time sensor, and the machine information includes working time information showing the working time which has been detected by the working time sensor. And the above described usage state decision means includes: reservation information reception means which receives reservation information showing a scheduled time for use of the working machine from each user terminal and user identification information of the one user who has made the reservation, and which stores the received reservation information in association with the user identification information in the storage means; machine information reception means which, based on the user identification information and the working time information included in the machine information received by the communication control means, generates actual usage information which shows the time and date of actual usage the working machine due to each user, and stores the actual usage information in association with the user identification information for each user in the storage means; and information comparison means which, by comparing the reservation information in association with the user identification information stored in the storage means with the actual usage information, detects, as the usage which constitutes a problem, actual usage due to a user for which, in the user or the usage time, a substantial difference from the reservation information exists.

In a preferred embodiment, the working machine includes a position measurement sensor, and the machine information includes position information showing the position which has been detected by the position measurement sensor. And the usage state decision means includes: reservation information reception means which receives reservation information showing a scheduled place for use of the working machine from each user terminal and user identification information of the one user who has made the reservation, and which stores the received reservation information in association the user identification information in the storage means machine information reception means which, based on the user identification information and the position information included in the machine information received by the communication control means, generates actual usage information which shows the place of actual usage of the working machine due to each user, and stores the actual usage information in association with the user identification information for each user in the storage means; and information comparison means which, by comparing the reservation information in association with the user identification information stored in the storage means with the actual usage information, detects, as the usage which constitutes a problem, actual usage due to a user for which, in the usage place, a substantial difference from the reservation information exists.

In a preferred embodiment, the working machine includes an engine cooling water temperature sensor, and the machine information includes water temperature information showing the engine cooling water temperature which has been detected by the engine cooling water temperature sensor. And the above described usage state decision means includes: machine information reception means which, based on the user identification information and the water temperature information included in the machine information received by the communication control means, calculates the engine water temperature or the load amount of the working machine which originates in usage due to each user; and information comparison means which, based on the engine water temperature or load amount for each user which has been calculated by the machine information reception means, detects, as the usage which constitutes a problem, usage imposing an excessive load on the working machine, performed by a user.

According to another aspect of the present invention, in a management system for managing the usage state of a working machine by a plurality of users, there are included the working machine and a server which are capable of mutual intercommunication via a wireless communication network, and the server is also capable of communication with a plurality of user terminals. The above described working machine includes: identification information input means which inputs user identification information of one user who is using the working machine at the present time; machine information generation means which receives a signal from a predetermined sensor within the working machine and generates machine information related to the state or to the operation of the working machine; and a communication device which can perform communication with the server via the wireless communication network, and which transmits to the server the user identification information which has been inputted by the identification information input means and the machine information which has been generated by the machine information generation means. And the server includes: storage means which stores information; communication control means which can perform via the wireless communication network communication with the working machine, which also can perform communication with the plurality of user terminals, and which receives the user identification information and the machine information from the working machine and moreover transmits a usage state report to the plurality of user terminals; load amount calculation means which calculates a cumulative load amount of the working machine resulted from use by each user, based on the user identification information and the machine information received by the communication control means, and which calculates a usage proportion for each user based on the cumulative load amount for each user; and a report information processing means which, in response to the load amount calculation means, generates report information showing the cumulative load amount and the usage proportion for each user, and transmits the report information to the plurality of user terminals by the communication device.

In a preferred embodiment, the load amount calculation means calculates a load amount for each unit interval during the period of usage by each user, weights the load amounts for each unit interval according to the magnitude of their load amounts, and calculates the cumulative load amount for each user by totaling the load amounts for each unit interval which have been weighted.

In a preferred embodiment, the working machine comprises a working time sensor and an engine cooling water temperature sensor, and the machine information includes working time information showing a working time detected by the working time sensor, and water temperature information showing an engine cooling water temperature detected by the engine cooling water temperature sensor. And the load amount calculation means calculates the cumulative load amount of the working machine resulted from use by each user, based on the user identification information which has been received by the communication control means and the working time information and the water temperature information which are included in the machine information.

According to the present invention, it is possible for a plurality of users who share the same working machine to perform mutual monitoring of the usage state of the working machine by several persons.

BRIEF DESCRIPTION OF THE DRAWINGS

FIG. 4 is a figure showing an example of a reservation table;

FIG. 5 is a figure showing an example of a joint owner table;

FIG. 9 is a figure for explanation of the method of calculating a cumulative load amount for one month;

FIG. 10 is a figure showing a display screen which shows usage state;

FIG. 11 is a figure showing a display screen for cumulative load amount and usage proportion.

BEST MODE FOR CARRYING OUT THE INVENTION

In the following, an embodiment of the present invention will be explained based on the drawings.

Figure 1:
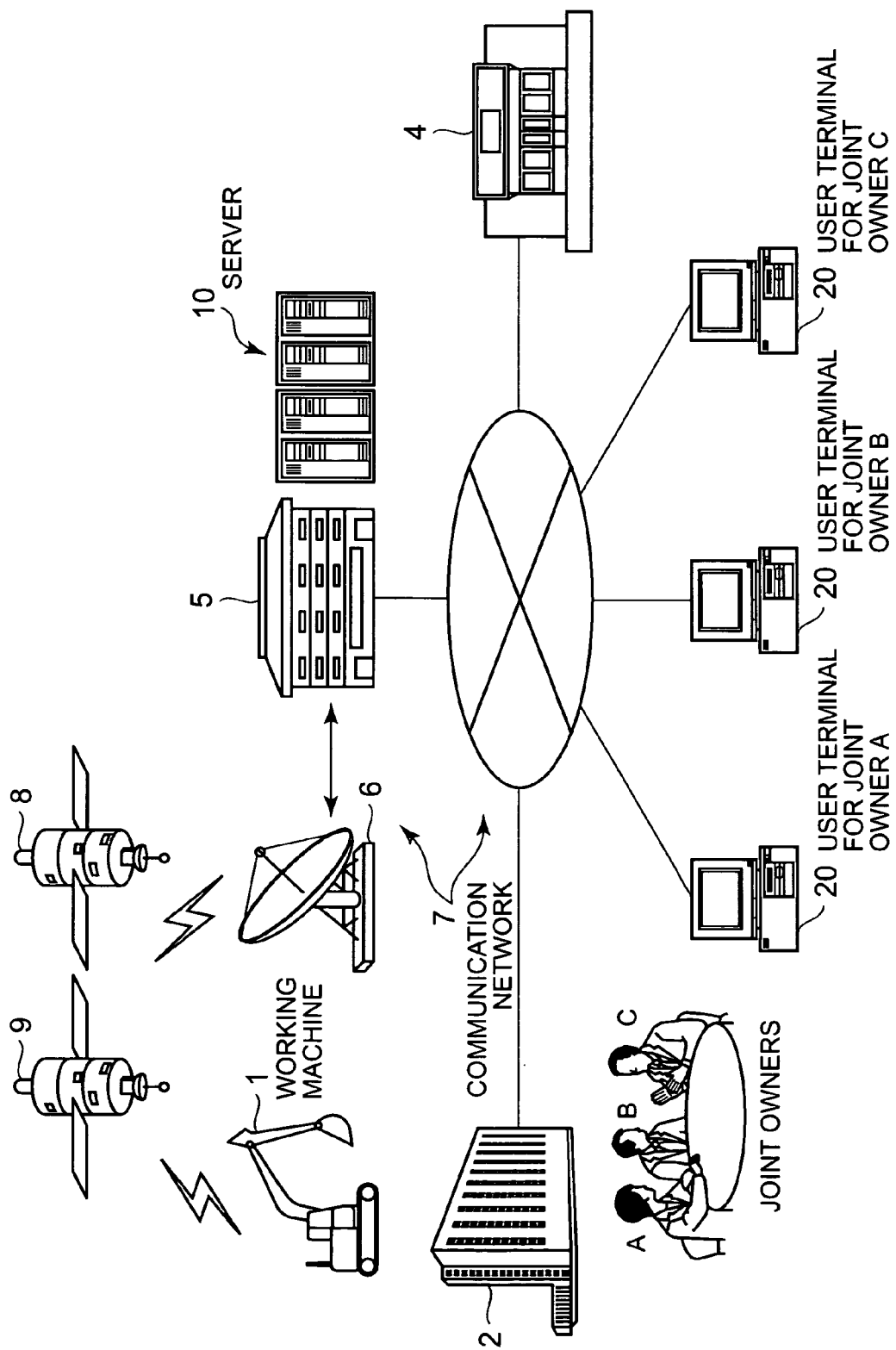
FIG. 1 is a schematic figure showing a management system for a working machine according to an embodiment of the present invention.

FIG. 1 is a schematic figure showing a management system for a working machine according to this embodiment.

The management system of this embodiment is arranged to be able, if some working machine 1 is owned jointly by a plurality of persons (in this embodiment, three persons) A through C, to monitor, for these mutual joint owners A through C, the state of usage by several people, based on various types of operational information which are obtained from the working machine 1, and furthermore is arranged to be able to determine a usage proportion for each of the joint owners, and to determine the division between the various persons of the costs such as maintenance and the like, according to this usage proportion. And, under control by this management system, the above described costs which have been divided between of the joint owners are automatically transferred from the accounts in the bank 2 of the joint owners A through C to a payee (for example, the sales agent 4 who has performed the maintenance service).

As shown in FIG. 1, this management system comprises a working machine 1, and also a server 10 which is provided in a network control bureau 5 on the side of the maker of the working machine, user terminals 20, 20, 20 which are provided on the sides of joint owners A through C, and a communication network 7 which connects these together. Here, this communication network 7 may be made up from a satellite communication circuit which connects together the working machine 1 and a satellite earth station 6 via a communication satellite 8, a dedicated earthbound communication circuit which connects together satellite earth station 6 and the server 10 of the network control bureau 5, and a computer network or the like such as an intranet or the internet or the like which connects together the server 10 and the user terminals 20, 20, 20. Furthermore, a terminal of a sales agent 4 who performs sales and maintenance of the working machine 1, or a terminal of a bank 2 or the like, may also be connected to the above described computer network.

Although only one working machine 1 is shown in the figure, actually a plurality thereof may be present. This plurality of working machines 1 may include a construction machine such as a hydraulic shovel, a wheel loader, a bulldozer, a motor grader, a crane or the like, or a haulage vehicle such as a dump truck or the like, or a demolition machine of various types or a generator or the like. Although it will be acceptable to provide only one server 10, a plurality thereof may be provided. By performing collective processing or distributed processing with one or a small number of servers 10, it is possible to perform monitoring of a plurality of working machines 1 and supply of information to a plurality of user terminals 20.

For the user terminals 20, general purpose personal computers which can execute various types of application software with OS (Operating Systems) may be employed. This application software includes a web browser which displays WWW documents which are supplied by the server 10, an electronic mailer which performs sending and reception of electronic mail, and the like.

Figure 2:
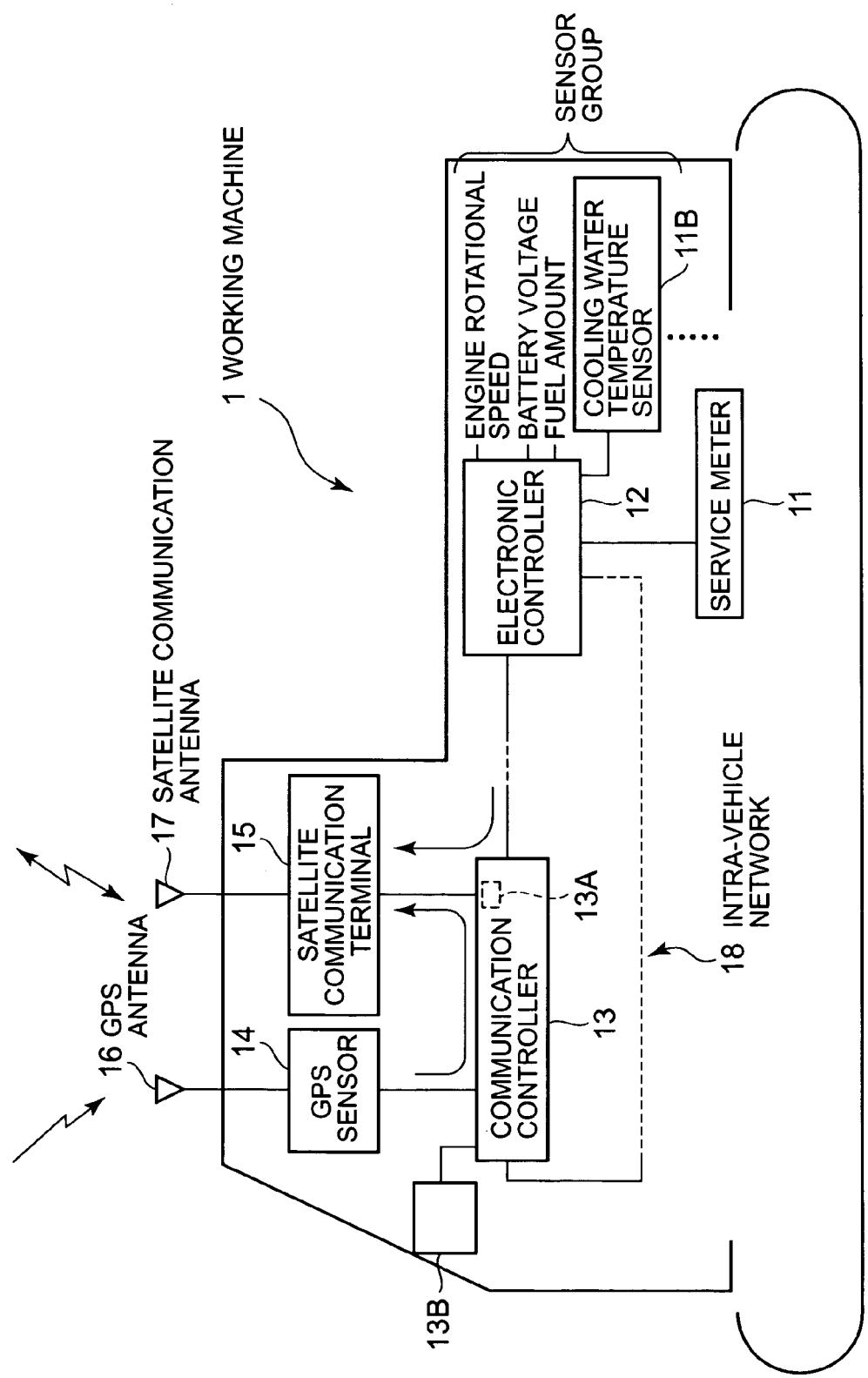
FIG. 2 is a block diagram showing the structure of a portion which is related to the management of the usage state by joint owners of the working machine.

FIG. 2 shows the structure of a section of the working machine 1 which is related to management of its usage state by the joint owners A, B, and C.

As shown in FIG. 2, this working machine 1 comprises an intra-vehicle network 18. This intra-vehicle network 18 includes an electronic controller 12 which monitors the states of various sections of the working machine 1 and moreover electronically controls the operation of various sections thereof, a communication controller 13 which is controlled by the electronic controller 12, a GPS (Global Positioning System) sensor 14 which is connected to the communication controller 13, a satellite communication terminal 15 which is connected to the controller 13, and the like. The GPS sensor 14 includes a GPS antenna 16 for receiving electromagnetic waves from a GPS satellite 9 (see FIG. 1), and measures the current position of the working machine 1 and notifies it to the communication controller 13. The satellite communication terminal 15 includes a satellite communication antenna 17 for communication with the communication satellite 8 (see FIG. 1), so that communication between the communication controller 13 and the server 10 may be performed via a satellite communication network.

The electronic controller 12 is connected to various types of sensor which are fitted to various structural elements of the working machine 1 (for example, its engine, battery, fuel tank, radiator, and so on). Among these sensors there may be, for example, a service meter 11 (a sensor which measures and integrates the working time), a cooling water temperature sensor 11B, an engine rotational speed sensor, a battery voltage sensor, a fuel amount sensor, and the like. The electronic controller 12 creates information (hereinafter referred to generically as operational information) which specifies the working time, the cooling water temperature, the engine rotational speed, the battery voltage, the fuel amount, and so on (in other words, various states and operations of the working machine 1) which have been detected by these sensors, and sends this operational information to the communication controller 13.

The communication controller 13 receives the above described operational information from the electronic controller 12. Furthermore, the communication controller 13 receives position information which specifies the current position from the GPS sensor 14. And the communication controller 13 transmits the above described operational information and the above described position information to the server 10 via the satellite communication terminal 15 and the satellite communication circuit. The server 10 stores this operational information and position information which it has received. And the server 10 ascertains the usage state of the working machine 1 (for example its working time and load amount and so on) by the joint owners A through C by automatically consulting the operational information which it has stored. Although, as described above, information about various states and operations which have been detected interior to the working machine 1 are included in this operational information, in this embodiment, among these, in particular, the working time from the service meter 11 and the cooling water temperature from the cooling water temperature sensor 11B are utilized by the server 10 as material for ascertaining the usage state, such as the working time and the load amount for each of the above described joint owners A through C. The operational information is transmitted to the server 10 periodically, for example at the frequency of once per day, along with day and time information. Among the operational information, in particular, the cooling water temperature which usually fluctuates may be transmitted to the server 10 more frequently, for example at a frequency of once every several tens of minutes, along with day and time information; and thereby the server 10 is able to calculate the load amount with good accuracy, based on the cooling water temperature.

The communication controller 13 comprises a writable non volatile storage device 13A, and in this there are stored the names of the joint owners A through C of the working machine and identification codes for them (hereinafter termed the joint owner IDs), and the operational history and so on of the working machine 1 such as the working time, the cooling working temperature, the work area, etc. A console box 13B which comprises a keyboard and a display screen is connected to the communication controller 13. This console box 13B is principally used for inputting to the communication controller 13 the joint owner ID of that one of the joint owners A through C who employs the operator, when the working machine 1 is being started. During operation after starting, the communication controller 13 stores in the storage device 13A the operational information such as the working time and the cooling water temperature sensor and so on and the position information which have been inputted from the electronic controller 12 and the GPS sensor 14 to the storage device 13A, set in correspondence with the joint owner ID which was inputted from the console box 13B during starting, and transmits this operational information in the storage device 13A along with the joint owner ID set in correspondence thereto to the server 10 via the satellite communication terminal 15. And the console box 13B also can be utilized for map display for vehicle navigation, based on the position information from the GPS sensor 14.

Figure 3:
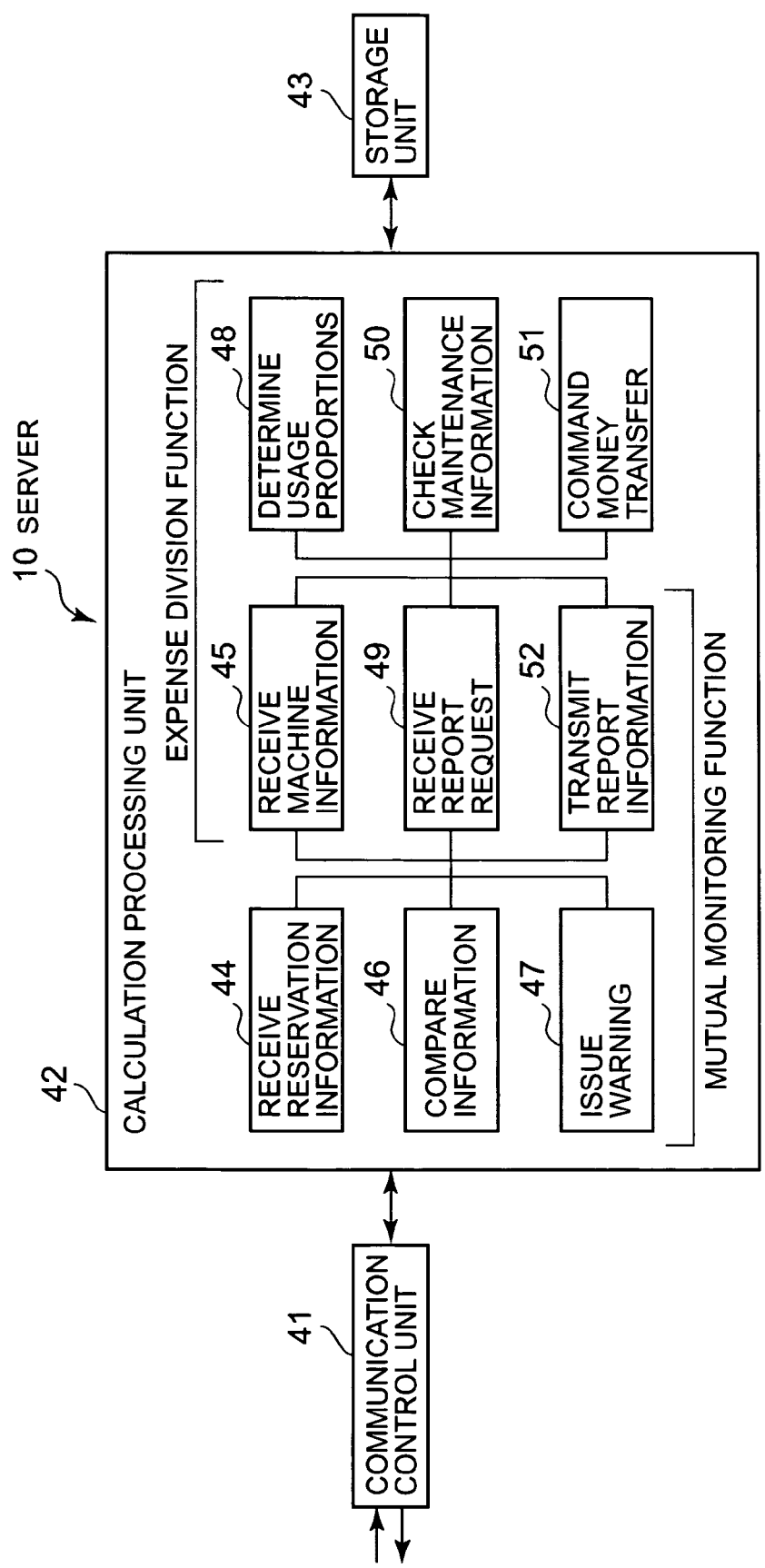
FIG. 3 is a block diagram showing the functional structure of a server 10.

FIG. 3 shows the functional structure of the server 10.

As has been already explained, the server 10 is connected to the computer network of the communication network 7, and receives and stores the operational information and the position information from the working machine 1 which is present at a remote location, and analyzes it. As shown in FIG. 3, the server 10 comprises a communication control unit 41 which controls communication with the computer network, a calculation processing unit 42 such as a μ processor which processes the information which it receives and transmits via the communication control unit 41, and a storage unit 43 which consists of a magnetic storage device or the like.

A computer program which is executed by the calculation processing unit 42 is stored in the storage unit 43. Furthermore, a data base is stored in the storage unit 43, and in this data base there are stored a reservation table 91 shown in FIG. 4, a joint owner table 92 shown in FIG. 5, and a load table 93 stored in FIG. 6; and, furthermore, there are also stored therein the operational information and the position information which have been received from the working machine 1, and calculation results which have been calculated from this information and so on.

FIG. 4 shows an example of the reservation table 91.

Such a reservation table 91 is provided for each of the joint owners A, B, and C (in FIG. 4, the reservation table 91 for the joint owner A is shown by way of example). The reservation table 91 for each of the joint owners A, B, and C is put into correspondence with the joint owner IDs of the corresponding joint owner A, B, and C, so as to make it possible to identify which joint owner it is for. In the reservation table 91 for a joint owner A, B, or C, there is entered information related to reservations for use of the working machine 1 by the joint owner A, B, or C: for example, the day the reservation was entered (the day of reservation), the planned operating day of the working machine 1 which has been reserved, and the time planned for operation and the place planned for operation and so on. The action of reservation by each of the joint owners A, B, and C (the registration of a reservation) is performed on-line to the server 10 from the corresponding user terminal 20, 20, 20. Each of the joint owners A, B, and C, when performing a reservation action on the server 10 from his user terminal 20, 20, 20, inputs his own joint owner ID from his user terminal 20, 20, 20 to the server 10, and thereafter inputs the details of the reservation, such as the day planned for operation, the time planned for operation, the place planned for operation, and so on. And the server 10 identifies the joint owner A, B, or C from the joint owner ID which has been inputted or the like, and enters the details of the reservation which has been inputted into the reservation table 91 for the joint owner who has been identified.

FIG. 5 shows an example of the joint owner table 92.

This joint owner table 92 as well is provided for each of the joint owners A, B, and C (in FIG. 5, the joint owner table 92 for the joint owner A is shown). The joint owner table 92 for each of the joint owners A, B, and C is put into correspondence with the joint owner ID of its one of the joint owners A, B, and C, so that it is possible to identify which joint owner it is for. In the joint owner table 92 for each of the joint owners A, B, and C, there is stored information which shows the actual amount of user of the working machine 1 by each of the joint owners A, B, and C, for example the actual day of operation, the actual working time, the actual place of operation, the cooling water temperature at fixed time intervals during one day, the average cooling water temperature during the working time for one day, the total load amount during one day, and the like, which are calculated by analyzing the operational information which are send from the working machine 1 to the server 10. The actual day of operation and the actual working time are calculated by analyzing the working time for each day which is received from the working machine 1. The actual place of operation is determined by analyzing the position information for each day which is received from the working machine 1, while referring to map data which is stored in the server 10 in advance. The cooling water temperature for fixed time intervals during the actual operation period and the average cooling water temperature for one day are obtained or are calculated from the cooling water temperature at intervals of some tens of minutes which is received from the working machine 1. And the total load amount for one day is calculated using a load table 93 which will be described hereinafter, based on the cooling water temperature at intervals of some tens of minutes which is received from the load table 93 working machine 1. As previously described, the server 10 identifies which of the joint owners it is according to the joint owner ID which is sent to the server 10, along with the position information and the operational information inputted from the console box 13B of the working machine 1, and enters, in the joint owner table 92 for the joint owner who has been identified, information which shows the above described amount of use which has been calculated based on the operational information and the position information which have been received.

Figure 6:
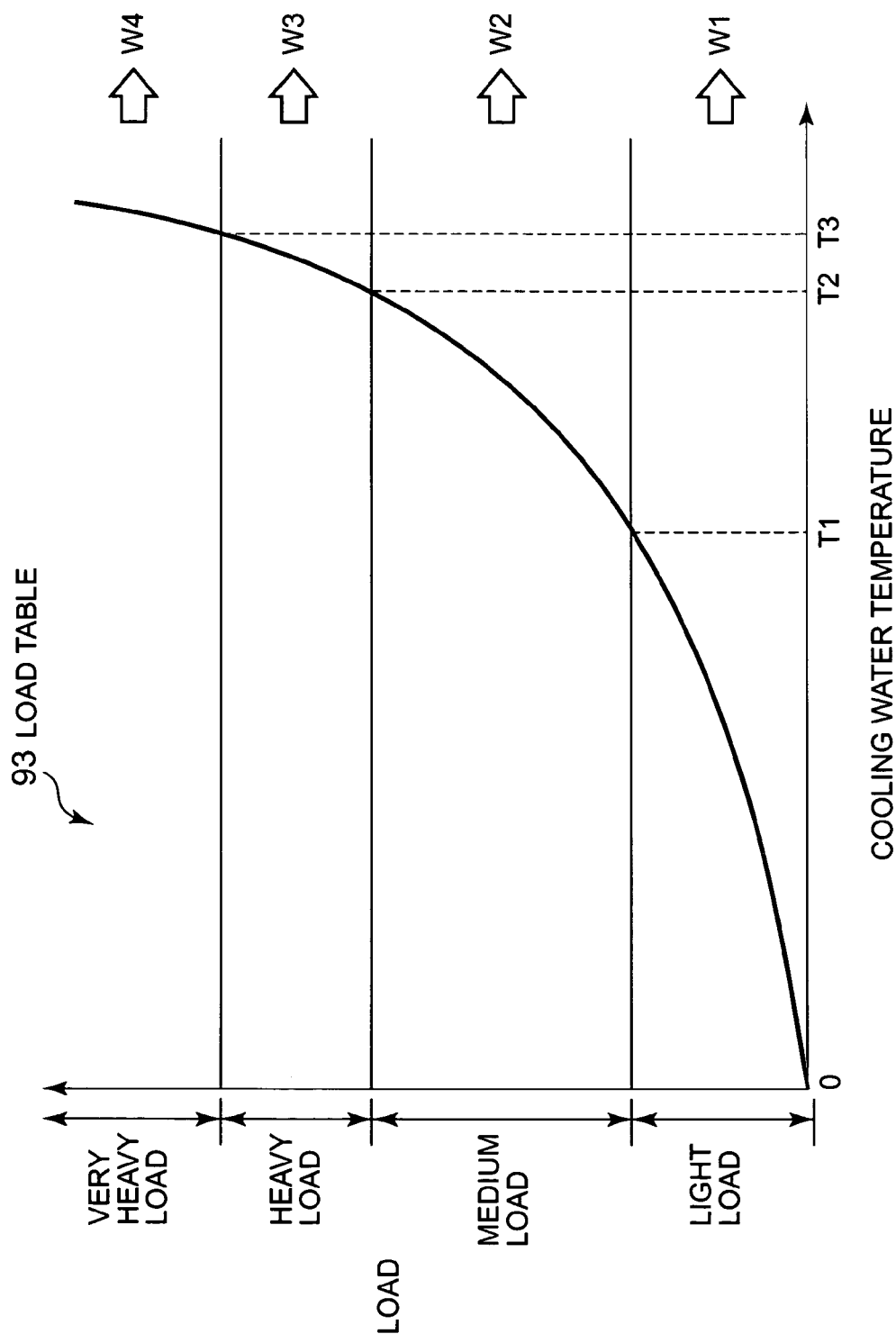
FIG. 6 is a figure showing an example of a load table b.

FIG. 6 shows an example of the load table 93.

This load table 93 is a conversion function which is used for determining the load amount (the power) per unit time of the working machine 1 (in particular, of the engine thereof) from its cooling water temperature. With the load table 93 which is shown by way of example in FIG. 6, furthermore, the load amount is classified into four ranks: "light load", "medium load", "heavy load", and "very heavy load". This classification is used for distinguishing under which load rank the load amount per unit time at some desired cooling water temperature is classified. In other words, the water temperature range from 0 to T1 is assigned the ranking of light load, the water temperature range above T1 to T2 is assigned the ranking of medium load, the water temperature range above T2 to T3 is assigned the ranking of heavy load, and the water temperature range above T3 is assigned the ranking of very heavy load. Very heavy load means an excessive load which ought to be avoided. Furthermore, weighting coefficients W1 through W4 are set for each load rank.

Referring again to FIG. 3, the calculation processing unit 42 of the server 10 is able to monitor the usage state of the working machine 1 between the joint owners A, B, and C, and moreover, by executing the above described computer program in order to allocate the expenses of the working machine automatically to the joint owners A, B, and C according to their usage proportions, performs a reservation information reception process 44, a machine information reception process 45, an information comparison process 46, a process for giving a warning 47, a usage proportion determination process 48, a report request reception process 49, a maintenance information check process 50, a money transfer command process 51, and a report information transmission process 52. Among these processes 44 through 52, the processes 44, 46, and 47 are functions for the above described mutual monitoring, while the processes 48, 50, and 51 are functions for the above described expense allocation; and, furthermore, the processes 45, 49, and 52 are functions for both of those objects. The server 10 operates as a web server with respect to the user terminals 20 of the joint owners A, B, and C, and accordingly each of the joint owners A, B, and C is able to receive the results of the above described processes 44 through 52 by the calculation processing unit 42 via a web browser on his respective user terminal 20. In the following, the above described processes 44 through 52 by the calculation processing unit 42 will be explained.

Figure 7:
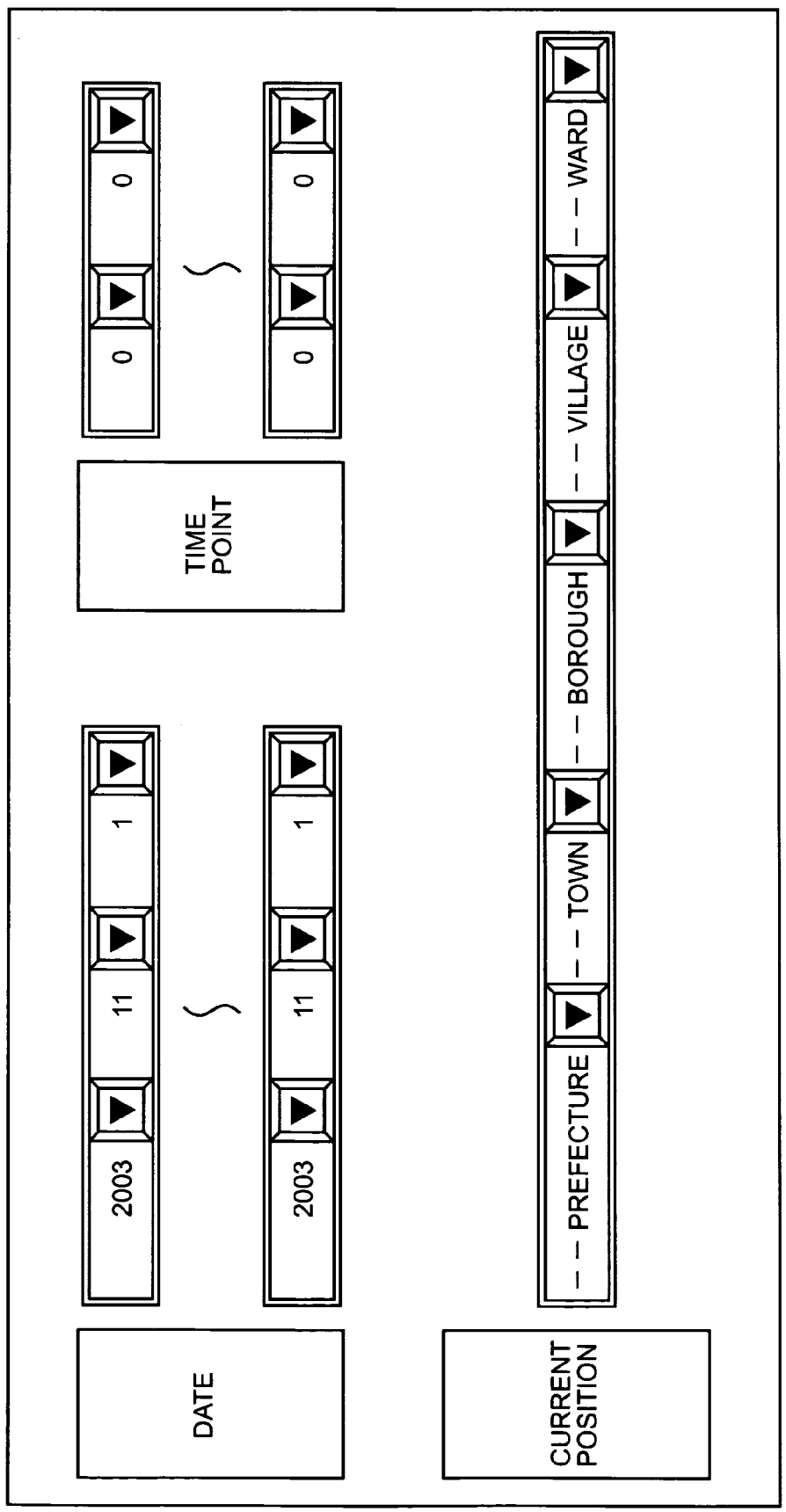
FIG. 7 is a figure showing an example of a reservation reception screen.

The reservation information reception process 44 is a function for receiving reservations for use of the working machine 1 from the joint owners A, B, and C. In this reservation information reception process 44, a reservation reception screen like the one shown in FIG. 7 is sent to a user terminal 20 and is displayed on a display device thereof. On this reception screen, from his user terminal 20, each of the joint owners A, B, and C is able to input the date and the time and the location at which he wants to use the working machine 1 (in the following, these will be termed the reservation information). In the reservation information reception process 44, the above reservation information inputted from the joint owners A, B, and C on the reservation reception screen is received from the user terminals 20, and the reservation information inputted from the joint owners A, B, and C is entered in the reservation tables 91 shown in FIG. 4 for each of the joint owners A, B, and C.

Figure 8:
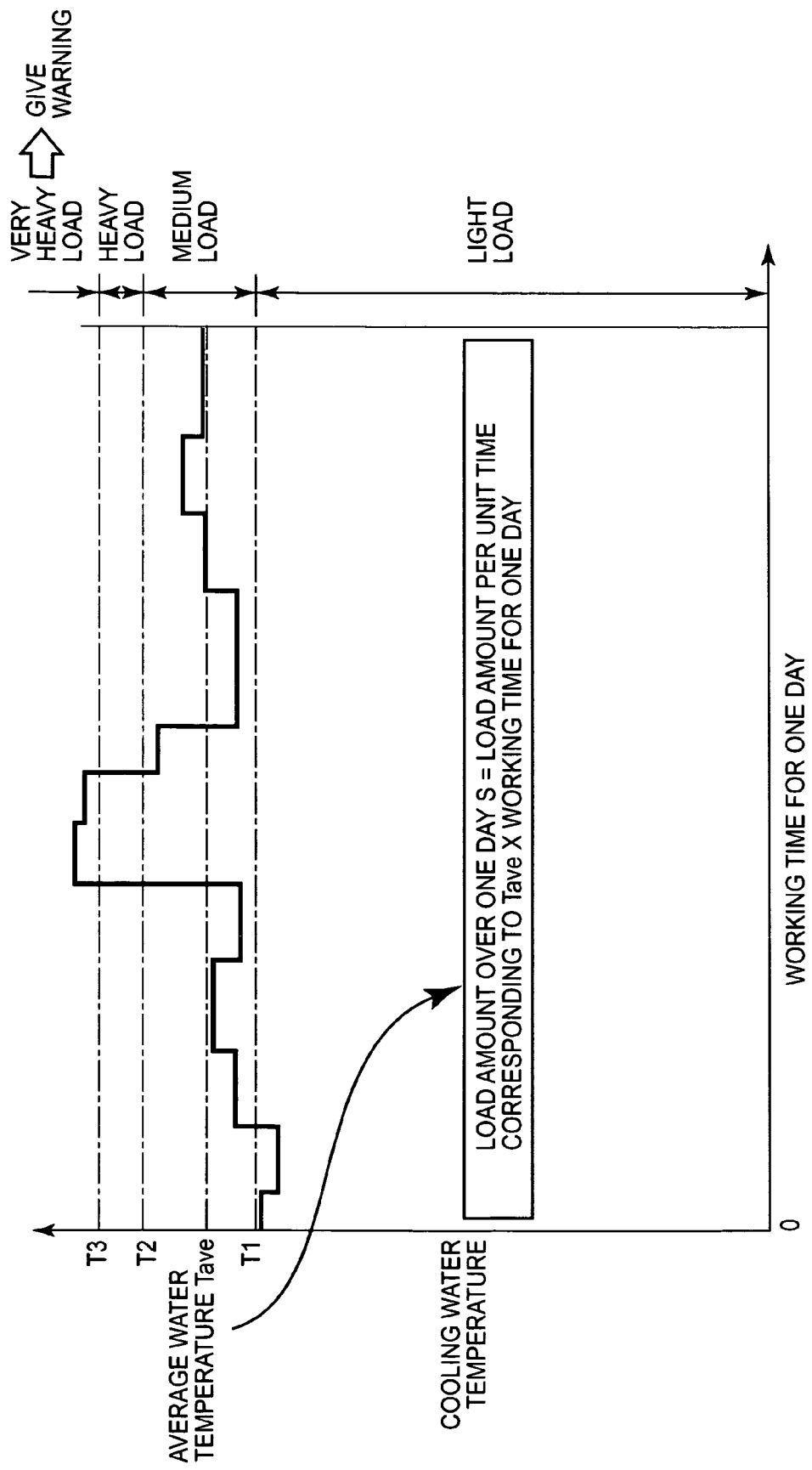
FIG. 8 is a figure showing an example of change of cooling water temperature during one day of working time.

The machine information reception process 45 is a function in which the operational information for the working machine 1 such as working time and cooling water temperature and the like and its position information (hereinafter, these will be generically termed the machine information) is received, and, from this received machine information, the above described actual day of operation, actual working time, actual location of operation, average water temperature during the working time of one day, and the total load amount for one day are calculated and are stored in the joint owner table 92 for the corresponding joint owner. In FIG. 8, an example of the change of water temperature which has been received from the working machine 1 during the working time for one day is shown. From this type of change of the cooling water temperature during the working time, the average water temperature Tave during the working time is calculated, and, by referring to the load table 93 shown by way of example in FIG. 6, the corresponding load amount per unit time (power) is calculated. And the total load amount S in one day is obtained by, for example, multiplying this load amount per unit time (power) which corresponds to the average water temperature Tave and the length of the working time in one day (refer to the equation in the figure).

The information comparison process 46 is a function for deciding whether or not there is any problem with the usage state of the working machine 1 by the joint owners A, B, and C. In this embodiment, there are two types of usage state which constitute a problem. The first of these is when the working machine 1 is not used according to the reservation information. The second of them is when a very heavy load is imposed on the working machine 1 (refer to FIG. 6). In the information comparison process 46, the reservation information which was entered in to the reservation tables 91 for the joint users A, B, and C (i.e. the user making the reservation, the day and time, and the location) and the operation information which has been entered in the joint owner table 92 (i.e. the user, the actual day of operation, the actual working time, and the actual place of operation) are compared together, and a decision is made as to whether or not the actual operation information for the joint owners A, B, and C substantially matches their reservation information. In the case that they do not match, there are the case that the actual user is different from the user who made the reservation, and the case that the actual day of operation, the actual working time, or the actual place of operation are different from those reserved. In the latter case, a predetermined margin of permitted range is set for the reservation information, and if the difference of the actual operational information from the reservation information is within the permitted range, then it is decided that it is substantially according to the reservation information. But, if the difference of the actual operational information for some joint owner from his reservation information is outside the permitted range, then it is decided that it does not substantially match the reservation information, and this decision result shows that there is a possibility that this joint owner has used the working machine 1 to a dishonestly great extent, against the consent of the other joint owners. Furthermore, this information comparison process 46 compares the cooling water temperature which has been detected with the threshold value T4 (refer to FIG. 6) which determines whether or not the load is a very heavy one, and thereby decides whether or not use has been performed so as to impose a very heavy load on the working machine 1. The information comparison process 46 may operate at the same time as the operational information and the position information from the working machine 1 are being received by the server 10, and thereby, when a usage state has occurred in which the above described type of problem is present, it is possible to detect this without any delay.

The process for giving a warning 47 is a function in which a warning is generated on the user terminals 20 of the joint owners A, B, and C, when the result of the decision by the above described information comparison process 46 is received and a usage state has been detected which constitutes a problem. In other words, in this process for giving a warning 47, if the result of the decision by the information comparison process 46 shows that the actual operational information of any one of the joint owners A, B, and C does not substantially match his reservation information, a warning is transmitted to the user terminals 20 of all of the joint owners A, B, and C, showing the details of this operational information, and by which joint owner the usage was performed. Furthermore, in this process for giving a warning 47, if the result of the decision by the information comparison process 46 shows that, during the actual working time by any one of the joint owners A, B, and C, a very heavy load has been imposed on the working machine 1, then a warning which shows the details of the operational information about this very heavy load, and by which joint owner the usage was performed, is transmitted to the user terminals 20 of all of the joint owners A, B, and C. By doing this, if any one of the joint owners 1 has used the working machine improperly, the other joint owners are immediately informed of this fact, and furthermore a caution is also issued to the person in question. This process for giving a warning 47 may operate at the same time as the information comparison process 46, and thereby, when a usage state has occurred which constitutes a problem as described above, it is possible to detect this without any delay.

The usage proportion determination process 48 is a function of accumulating by units of calendar months the total load amounts for one day for each operational day which have been recorded in the joint owner table 92 of each of the joint owners A through C, calculating a cumulative load amount for each of the joint owners A through C for each month, and calculating, based thereon, a usage proportion for each of the joint owners A through C for each month. In FIG. 9, by way of example, there is schematically shown a method of calculation for the cumulative load amount, when some joint owner has used the working machine 1 for 9 hours during some month (irrespective of whether such usage was continuous or interrupted). In other words, each of the load amounts S1 through S9 during that month is read out from the joint owner table 92, the average load amount thereof. Save is calculated, and the cumulative load amount for the corresponding month is calculated by multiplying this average load amount Save and the number of operating days (in this example, 9), so that, accordingly, what is obtained is not merely a simple cumulative load amount, but rather a weighted cumulative load amount. In this calculation, the load amounts S1 through S9 for the days are weighted (refer to the equation in FIG. 9) by weighting coefficients W1 through W4 (refer to FIG. 6) which correspond to the load rank of the average water temperature Tave. for the corresponding day. By setting larger weighting coefficients for greater load ranks, even if the usage is the same for the simple cumulative load amounts, the cumulative load amount which has been weighted becomes greater for usage in which the frequency of imposing heavier loads is high. The cumulative load amounts for the joint owners A through C which have been calculated in this manner are totaled, and the usage proportion for the corresponding month for each of the joint owners A through C is calculated by dividing the cumulative load amounts for each of the joint owners A through C by this total cumulative load amount. By performing weighting according to the magnitude of the load as described above, it is possible to determine the usage proportion for each of the joint owners A, B, and C more fairly, in correspondence to the degree of deterioration of the working machine 1 which is caused due to the use by each of the joint owners A, B, and C.

The report request reception process 49 is a function of receiving requests for reporting of information related to the usage state and the usage proportion of the working machine 1 from the user terminals 20 of each of the joint owners A, B, and C. In this report request reception process 49 for receiving these report requests, predetermined information is readout from the reservation tables 91 and the joint owner table 92 for all of the joint owners A, B, and C, and the information which has thus been read out is processed and a report screen is created on which the operation history and the usage proportions between the joint owners may be compared, and this report screen is transferred to the report information transmission process 52. Even if there is no such information request from the joint owners A, B, and C as described above, this report request reception process 49 creates the above described report screen periodically (for example, at a fixed day in each month), and transfers it to the report information transmission process 52.

The maintenance information check process 50 is a function of receiving information about the maintenance services which have been performed on the working machine 1, arriving from a terminal of the sales and service agent 4, and recording its invoice value in the storage unit 43.

In the money transfer command process 51, the maintenance costs which have been thus recorded in the storage unit 43 are allocated between the joint owners A through C according to the usage proportions for the joint owners A, B, and C which have been calculated by the previously described usage proportion determination process 48, and, on the predetermined appointed day for payment, the allocated amount to be paid by each of the joint owners A through C is notified to the side of the bank 2. And the bank 2 transfers the payment amounts for each of the joint owners A through C which have thus been notified from the bank accounts of each of the joint owners A through C to the bank account of the sales and service agent 4.

In the report information transmission process 52, if an information request as described above has been received from any one of the joint owners A through C, or on a fixed day in each month even if there has been no such information request, the report screen which has been created by the above report request reception process 49 is transmitted to the user terminals 20 of the joint owners A, B, and C, and is displayed thereon.

In FIG. 10 and FIG. 11, there are shown examples of report screens which are transmitted by the report information transmission process 52 and displayed on the display devices of the user terminals 20. FIG. 10 is an example of a report screen showing the usage state, while FIG. 11 is an example of a report screen showing the usage proportions.

In the report screen shown in FIG. 10 which shows the usage state, there are displayed the days, during the period which is desired to be displayed, on which the working machine 1 was used, the user (any one among the joint owners A, B, and C), the operation history, the working time, the load amount on that day, identification marks 53, 54, 55 that shows that a warning has occurred, and the like. In the display of the operation history, the horizontal axis shows time (0 to 24 hours), and the time periods over which the working machine 1 was actually operating are shown by blocks. For the operation history and the working time, the reservations which were entered in the reservation table 91 are displayed in an upper line, and the actual results of use which were entered in the joint owner table 92 are displayed in a lower line, so that they can be easily compared together. As already explained with reference to FIG. 8, the load amount over one day is a value which is calculated by multiplying the working time for one day by the average working temperature Tave. during that working time. The identification mark 53 means that a warning was issued because the actual day of operation, the working time, or the operating location was substantially different from the reservation. The identification mark 54 means that a warning was issued because use has been performed with a very heavy load. And the identification mark 55 means that a warning was issued due to the actual user (the owner's ID which was inputted from the monitor 13B of the working machine 1) was different from the reservation. On clicking each of these identification marks 53, 54, or 55 with the mouse or the like, the detailed information included in the warning is displayed. Furthermore, the actual location of operation may also be displayed on this screen.

As shown in FIG. 11, on the screen which shows the usage proportions, there are displayed the operating month for the period (in units of months) which it is desired to display, and the cumulative load amounts and the usage proportions for each of the joint owners A, B, and C for the corresponding month of operation. Apart from these, if maintenance costs occur in the corresponding month, the payment amount for each of the joint owners A, B, and C due to allocating these costs according to the usage proportion may also be displayed.

Figure 12:
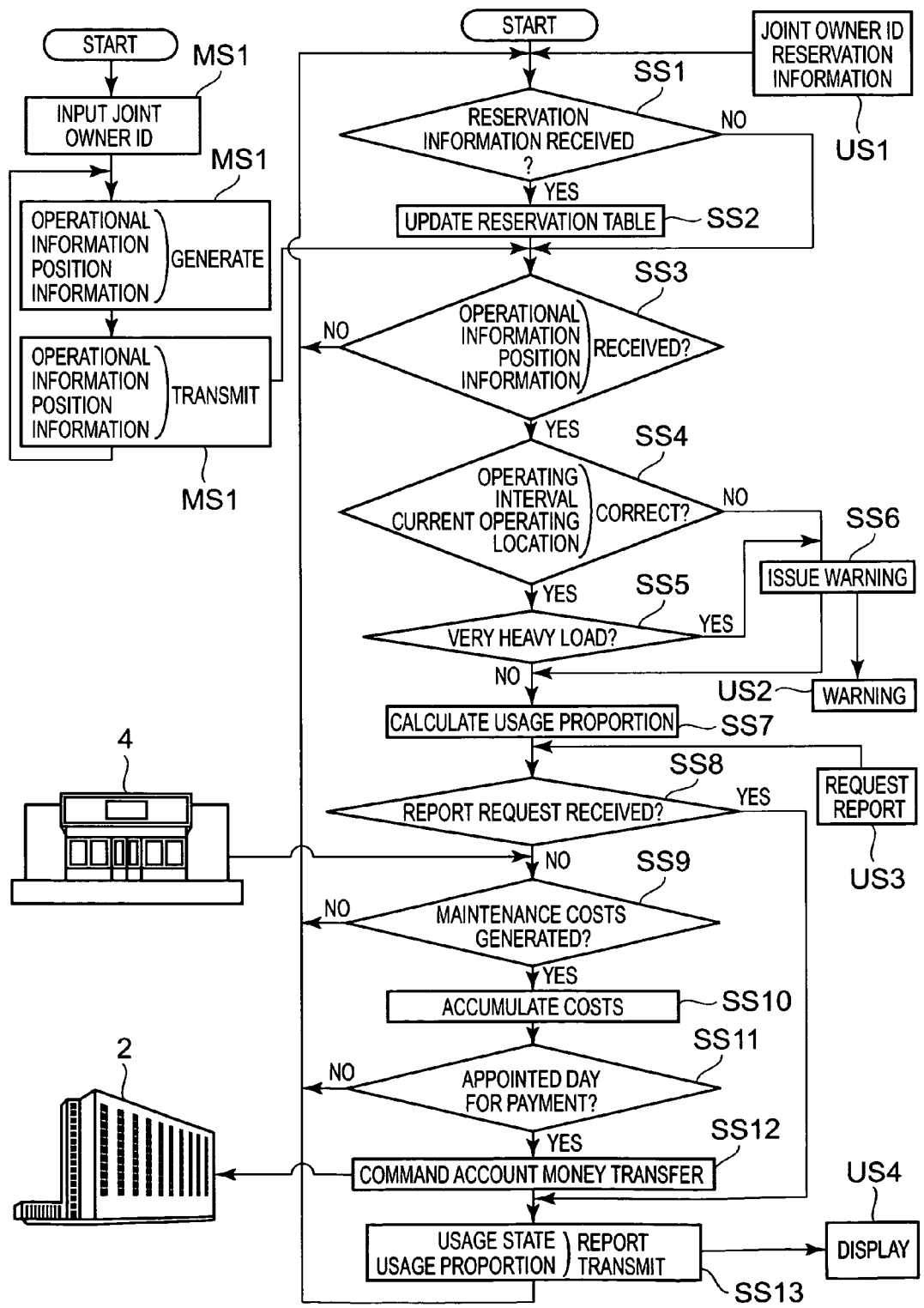
FIG. 12 is a flow chart showing the processing flow of this management system.

FIG. 12 shows the flow of processing of a management system having the above described structure. In the following, the processing flow of this management system will be explained with reference to FIG. 11.

In the following explanation, reference symbols to which "MS" is prefixed relate to steps which are performed by the working machine 1, reference symbols to which "SS" is prefixed relate to steps which are performed by the server 10, and reference symbols to which "US" is prefixed relate to steps which are performed by a user terminal 20.

US1, SS1, SS2: the user terminal 20 of some joint owner A, B, or C sends the joint owner ID of that joint owner and reservation information which has been inputted from that joint owner (a day planned for operation, a time planned for operation, and a location planned for operation) to the server 10. In the server 10, the reservation information reception process 44 receives the reservation information from the user terminal 20, and enters this reservation information, in other words the day planned for operation, the time planner for operation, and the place planned for operation, into the reservation table 91 in correspondence with the joint owner ID which has been received.

MS1: In the working machine 1, when the operator starts the working machine 1, he inputs the joint owner ID of some joint owner of the working machine 1, in order to inform the server 10 for which one of the joint owners work is to be performed.

MS2, MS3: at a predetermined timing during the operation of the working machine 1, the communication controller 13 of the working machine 1 transmits to the server 10 the machine information, in other words the above described joint owner ID, the operational information (the working time and the cooling water temperature and so on), and the position information and so on.

SS3: in the server 10, the machine information reception process 45 receives the machine information from the working machine 1, calculates the actual operational information such as the actual day of operation, the actual working time, the actual place of operation, the cooling water temperature, the average water temperature, the load amount over one day, and the like based on this machine information, and enters this actual operational information into the joint owner table 92 (see FIG. 5) in correspondence with the joint owner ID which has been received.

SS4: in the server 10, the information comparison process 46 compares together the actual day of operation, the actual working time, and the actual place of operation which were entered into the owner table 92 in the step SS3, and the day planned for operation, the time planned for operation, and the place planned for operation which are recorded in the information reservation table 91 for the corresponding joint owner.

SS5: furthermore, the information comparison process 46 checks whether or not the cooling water temperature which was entered into the owner table 92 in the step SS3 is above the threshold value T3 for deciding whether the load is very heavy or not.

SS66, US2: if the result of the comparison in the step SS4 is that it has been decided that the actual operational information does not substantially match the reservation information, then the process for giving a warning 47 transmits a warning to that effect to the user terminals 20 of all of the joint owners A, B, and C. Furthermore, in a step SS5, if it has been detected that working at very heavy load has been performed, then the process for giving a warning 47 also transmits a warning to that effect to the user terminals 20 of all of the joint owners A, B, and C. In each of the user terminals 20, the contents of these warnings are outputted on the display screen of the console box 13.

SS7: the usage proportion determination process 48 determines the user proportions of the various joint owners A, B, and C for one month, based on the load amounts for each day of operation for the joint owners A, B, and C which are recorded in the joint owner table 92. As has already been explained with reference to FIG. 9, in the usage proportions for the joint owners A, B, and C, the joint owners A, B, and C are weighted according to the magnitude of the loads (the load rankings which were imposed on the working machine 1.

US3, SS8, SS13: each of the joint owners A, B, and C can transmit, at any desired time, a report request from his respective user terminal 20 to the server 10. In the server 10, on receipt of this report request, the report request reception process 49 creates a report screen of the type shown by way of example in FIG. 10 and FIG. 11. And the report information transmission process 52 transmits this report screen to this user terminal 20. In this user terminal 20, this report screen is displayed.

SS9 through SS11: furthermore, in the server 10, the maintenance information check process 50 receives maintenance information, including an invoice for maintenance costs, from the sales and service agent 4, and stores this maintenance information in the storage unit 43. If a maintenance information has been received a plurality of times before the appointed day for payment arrives, this maintenance information a plurality of times is accumulated in the storage unit 43.

SS12: when the appointed day for payment arrives, the money transfer command process 51 calculates the total amount of the costs which must be paid from the maintenance information which has been accumulated in the storage unit 43, divides this total costs amount between the joint owners A, B, and C according to the usage proportions for the joint owners A, B, and C which were calculated in the step SS7, and notifies the amount of money allocated to each of the joint owners A, B, and C to the bank 2. As a result, the amounts of money which were allocated to each of the joint owners A, B, and C are transferred from the bank accounts of the joint owners A, B, and C to the bank account of the sales and service agent 4.

SS13: when, at a fixed period, a reporting day arrives, such as for example a fixed day of each month, the report request reception process 49 creates report screens such as the ones shown by way of example in FIG. 10 and FIG. 11, and the report information transmission process 52 transmits these report screens to all of the user terminals 20 of the joint owners A, B, and C. These report screens are displayed by each of the user terminals 20.

According to the embodiments explained above, there are the following beneficial effects.

(1) The joint owners A, B, and C are able to ascertain in concrete terms, by referring to the above described report screens via their respective user terminals 20, the reservation situation for usage of the working machine 1 by themselves and by other joint owners, the actual usage state of the working machine 1 by themselves and by other joint owners, and the truth as to whether any of the joint owners has used the working machine 1 in violation of the reservation procedure.

(2) The joint owners A, B, and C are able to know without any delay that a usage has taken place by some one of the joint owners which constitutes a problem (such as usage against the reservation procedure, or usage while imposing a very heavy load on the working machine 1, or the like), due to a warning being issued from the server 10 automatically.

(3) The server 10 monitors the cooling water temperature which is detected internally to the working machine 1 at short time intervals like some tens of minutes, and decides the magnitude of the load amount which is being imposed on the working machine 1 based on this cooling water temperature. Due to this, if usage has taken place to an excessively relentless degree, it is possible to detect this with good accuracy and moreover substantially in real time. And, when this type of excessively relentless usage is detected, a warning is issued automatically. Accordingly this type of excessively relentless usage is suppressed, and breakdown of, damage to, and decrease of the lifetime of the working machine 1 are prevented.

(4) The load amount on the working machine 1 due to usage by the joint owners A, B, and C is calculated from the cooling water temperature and the working time which are detected by the working machine 1. Due to this, it is possible to ascertain the load amount with good accuracy.

(5) The cumulative load amount on the working machine 1 due to usage by the joint owners A, B, and C is weighted by the weighting coefficients W1 through W4, according to the magnitude of the load (the load rank) based on the cooling water temperature. Due to this it is possible, not only simply to ascertain the cumulative load amount, but also to quantify the negative influence on the working machine 1 due to the magnitude of the load, in other words to excessively relentless usage. And the usage proportions for the joint owners A, B, and C are calculated based on the cumulative load amounts for the joint users A, B, and C. Accordingly, it is possible to evaluate the states of usage by the joint users A, B, and C fairly, according to their actual individual usages. It is possible for the joint owners A, B, and C to mutually monitor the results of evaluation of the usage state of each of the joint users A, B, and C. As a result, excessively relentless usage of the working machine 1 is suppressed, and breakdown, damage to, and decrease of the lifetime of the working machine 1 are prevented.

It should be understood that the present invention is not limited to the embodiment above; changes and so on such as those shown below, including other structures which can attain the object of the present invention, are also included within the present invention.

For example instead of, or as well as, the temperature of the cooling water of the engine, it would also be possible to employ information relating to other states or operations as information on which the calculation of the load amount is based (load information). For example, with a working machine which comprises a hydraulic system such as a construction machine, it would also be acceptable to employ, for the load information, the discharge pressure of a hydraulic pump, or the hydraulic pressure of a hydraulic actuator. Or it would also be acceptable to utilize, for the load information, the fuel injection amount to the engine, the engine rotational speed, or the output power of the engine. And, in the case of a generator, it would also be possible to use the power generated for the load information.

Furthermore it would also be possible to employ, as the material for calculation of the load amount and for the decision as to whether the load is unusual, instead of, or as well as, the average value of load information such as the average temperature of the cooling water of the engine, the peak value of the load information, its maximum value, its instantaneous value, its maximum value during a predetermined time interval (for example, a unit time, the working time, or one day or the like), its cumulative value during a predetermined time interval, or the like.

Allocation of the costs according to the usage proportions for the joint owners A, B, and C may also be performed, not only for the maintenance costs, but also, for example, for the amount of monthly payment on a loan, and for the wages of the operator and the like.

Although, in this embodiment, the server 10 was the property of the side of the maker of the working machine, it could also be the property of the sales agent 4, or it could also be the property of some other company, such as one specializing in information management.

Moreover, among the processes 44 through 52 of the server 10 which have been explained in the above embodiment, at least a portion thereof may be incorporated in the user terminals 20 or in the working machine 1.

In any case, although preferred structures and methods and so on for implementing the present invention are described in the above, they are not to be considered as being limited thereby. In other words, although principally the present invention has been particularly shown in the figures and moreover explained in terms of a specific embodiment, in other embodiments than the one described above, it is possible for a person skilled in the art to make various changes to the methods, numerical values, and other detailed structures, provided that the technical scope and the objects of the present invention are not departed from.

Accordingly, the limited description above of methods, numerical values and the like was provided by way of example in order to simplify the explanation of the present invention; and, since that description is not to be considered as being limitative of the present invention, description by expressions other than limited by some part or by all of these methods, numerical values and so on is also to be considered as being included within the scope of the present invention.

The invention claimed is:

1. A management system, for managing usage states of a working machine by a plurality of users, comprising:
a server for communicating via a wireless communication network with the working machine, and also capable of communication with a plurality of user terminals,
the working machine comprising:
identification information input means which inputs user identification information of one user who is using the working machine at the present time;
machine information generation means which receives a signal from a predetermined sensor within the working machine and generates machine information related to a state or to an operation of the working machine; and
a communication device which can perform communication with the server via the wireless communication network, and which transmits to the server the user identification information which has been inputted by the identification information input means and the machine information which has been generated by the machine information generation means,
the server comprising:
storage means which stores information;
communication control means which can perform communication with the working machine via the wireless communication network, which also can perform communication with the plurality of user terminals, and which receives the user identification information and the machine information from the working machine and transmits a warning to the plurality of user terminals;
usage state decision means for detecting which user's usage of the working machine constitutes a problem based on the user identification information and the machine information received by the communication control means; and
warning generation means which generates the warning in response to the usage state decision means, and makes the communication device transmit the warning to the plurality of user terminals,
wherein the working machine comprises a working time sensor,
the machine information includes working time information showing a working time which has been detected by the working time sensor, and the usage state decision means comprises reservation information reception means which receives reservation information showing a scheduled time for use of the working machine from each user terminal and the user identification information of the one user who has made a reservation, and which stores the received reservation information in association with the user identification information in the storage means;

machine information reception means which, based on the user identification information and the working time information included in the machine information received by the communication control means, generates actual usage information which shows time and data of an actual usage of the working machine due to each user, and stores the actual usage information in association with the user identification information in the storage means; and information comparison means which, by comparing the reservation information associated with the user identification information stored in the storage means with the actual usage information, detects, as an usage which constitutes a problem, an actual usage due to a user for which, in the user or the usage time, a substantial difference from the reservation information exists.

2. The management system according to claim 1, wherein the working machine comprises a position measurement sensor, the machine information includes position information showing a position which has been detected by the position measurement sensor, and the usage state decision means comprises:

reservation information reception means which receives reservation information showing a scheduled place for use of the working machine from each user terminal and the user identification information of the one user who has made a reservation, and which stores the received reservation information in association with the user identification information in the storage means;

machine information reception means which, based on the user identification information and the position information included in the machine information received by the communication control means, generates actual usage information which shows the actual usage place of the working machine due to each user, and stores an actual usage information in association with the user identification information for each user in the storage means; and information comparison means which, by comparing the reservation information in association with the user identification information stored in the storage means with the actual usage information, detects, as an usage which constitutes a problem, an actual usage due to a user for which, in the usage place, a substantial difference from the reservation information exists.

3. The management system according to claim 1, wherein the working machine comprises an engine cooling water temperature sensor, the machine information includes water temperature information showing an engine cooling water temperature which has been detected by the engine cooling water temperature sensor, and the usage state decision means comprises:

machine information reception means which, based on the user identification information and the water temperature information included in the machine information received by the communication control means, calculates an engine water temperature or a load amount of the working machine which originates in usage due to each user; and information comparison means which, based on the engine water temperature or the load amount, for each user, which has been calculated by the machine information reception means, detects, as an usage which constitutes a problem, an usage imposing an excessive load on the working machine, performed by the user.

* * * * *